US009686131B2

(12) United States Patent
Wei et al.

(10) Patent No.: US 9,686,131 B2
(45) Date of Patent: Jun. 20, 2017

(54) SYSTEM, GATEWAY, AND METHOD FOR AUTOMATIC SETTING CONFIGURATION BY LEARNING COMMANDS (75) Inventors: Bo Er Wei, New Taipei (TW); Kuo Wei Chu, New Taipei (TW)

(73) Assignee: MOXA INC., New Taipei (TW)

(*) Notice: Subject to any disclaimer, the term of this patent is extended or adjusted under 35 U.S.C. 154(b) by 240 days.

(21) Appl. No.: 13/325,060

(22) Filed: Dec. 14, 2011

(65) Prior Publication Data
US 2013/0159447 A1 Jun. 20, 2013

(51) Int. Cl.
G06F 15/16 (2006.01)
H04L 12/24 (2006.01)

(52) U.S. Cl.
CPC ...... *H04L 41/0806* (2013.01); *H04L 41/0886* (2013.01)

(58) Field of Classification Search
CPC ............. H04L 41/0213; H04L 41/0886; H04L 12/2803; H04L 29/12226; H04L 41/0803; H04L 41/0806
USPC .................. 709/208, 211, 224, 220, 223, 209
See application file for complete search history.

(56) References Cited

U.S. PATENT DOCUMENTS

| 5,523,915 | A | * | 6/1996 | Kamuda .................. 365/189.15 |
| 5,574,849 | A | * | 11/1996 | Sonnier et al. .................. 714/12 |
| 6,130,892 | A | * | 10/2000 | Short et al. .................... 370/401 |
| 6,304,904 | B1 | * | 10/2001 | Sathyanarayan et al. .... 709/224 |
| 6,760,774 | B1 | * | 7/2004 | Soumiya et al. .............. 709/233 |
| 2005/0074016 | A1 | * | 4/2005 | Dekeyser ........................ 370/401 |
| 2008/0189441 | A1 | * | 8/2008 | Jundt et al. ........................ 710/3 |
| 2009/0034477 | A1 | * | 2/2009 | Yamaguchi et al. .......... 370/331 |
| 2011/0258433 | A1 | * | 10/2011 | Pulini et al. ................... 713/153 |
| 2012/0323368 | A1 | * | 12/2012 | White et al. .................. 700/275 |

* cited by examiner

Primary Examiner — Shean Tokuta
(74) Attorney, Agent, or Firm — Chih Feng Yeh; Huntington IP Consulting Co., Ltd.

(57) ABSTRACT

A system, a gateway, and a method for automatic setting configuration by learning commands are provided. The invention collects communication commands sent in a first network, stores target data accessed by a first device in the first network according to the communication command to an address, and maps the address to an I/O module used to access the target data by a second device. The system and the method can set the configuration of a gateway automatically, and achieve the effect of enhancing the efficiency of gateway configuration setting.

11 Claims, 9 Drawing Sheets

SYSTEM, GATEWAY, AND METHOD FOR AUTOMATIC SETTING CONFIGURATION BY LEARNING COMMANDS

BACKGROUND OF THE RELATED ART

Technical Field

The invention relates to a system, gateway, and method for automatic setting configuration and, in particular, to a system, gateway, and method of automatic setting configuration by learning commands.

Related Art

When devices in two networks that use different communication protocols want to exchange data, one needs a gateway that can integrate the communication protocols used by the two networks. That is, when one device transmits target data to the gateway, the gateway obtains the target data according to the protocol of the data-transmitting device, and relays to the target data to the data-receiving device according to the corresponding protocol.

In order for the gateway that mediates different networks to correctly obtain the target data using the protocol of the data-transmitting device and to use the protocol of the data-receiving device to correctly provide the target data, the gateway needs to be set correctly by the user.

According to the current method of setting the gateway between different networks, one has to first look up a datasheet to obtain the parameters of device ID/Address, supported commands, data storage location, data length, and polling interval of each of the data-receiving devices. According to the parameters, communication commands that may be used to pass target data to the data-receiving device are set in the gateway. Afterwards, the internal memory of the gateway is configured such that the data accessed by the above-mentioned communication commands are mapped to the configured storage space. The I/O module that accesses the internal memory of the gateway for exchange the target data between the data-transmitting device and the gateway is also configured. Afterwards, the user starts to test whether the above settings are correct, i.e., testing whether target data are correctly transmitted. If not, then incorrect settings are modified until they are all correct.

In practice, since setting a command requires many parameters and a system usually works with tens to one hundred commands that it may take the user a few hours to several days to set these parameters. In addition to incorrect settings, one has to continuously test in order to make sure that the settings are completely correct. It is very time-consuming and inconvenient.

In summary, the prior art always has the problems of inconvenience and time waste in setting the gateway that connects different networks. It is thus imperative to provide a better solution.

SUMMARY

In view of the foregoing, the invention provides a system, gateway, and method for automatic setting configuration by learning commands.

The disclosed gateway includes: internal memory; a first communication interface for connecting to a first network using a first communication protocol, the first network including a first device; a second communication interface for connecting to a second network using a second communication protocol, the second network including a second device; a setting module for setting the communication parameters in the first communication protocol in the first communication interface; a condition judging module for determining whether a stop collecting condition is satisfied; a command collecting module for collecting the communication commands sent in the first network via the first communication interface until the condition judging module determines that the stop collecting condition is satisfied; and a data mapping module for storing target data accessed by the communication commands in the internal memory and for mapping the storage address of the target data to an I/O module via which the second device can access the target data.

The disclosed system includes: a setting module for setting the communication parameters of a first communication protocol used by a gateway; a condition judging module for determining whether a stop collecting condition is satisfied; a command collecting module for collecting communication commands transmitted in a first network via a first communication interface until the condition judging module determines that the stop collecting condition is satisfied; a data mapping module for storing target data accessed by the communication commands in internal memory of the gateway and mapping the storage address of the target data to a communication I/O module so that a second device accesses the target data via the communication I/O module.

The disclosed method includes the steps of: setting communication parameters of a first communication protocol used by a gateway; connecting the gateway to a first network that uses the first communication protocol and includes at least a first device; collecting communication commands transmitted in the first network until a stop collecting condition is satisfied; mapping the storage address of target data accessed by the communication commands to a communication I/O module so that a second device that uses a second communication protocol and connects to the gateway access the target data via the communication module.

As described above, the invention differs from the prior art in that the invention collects the communication commands transmitted in the first network and maps the storage address of the target data accessed by the communication commands to the communication I/O module for the second device to access the target data via the gateway. This technique solves problems in the prior art and increases the efficiency in the configuration setting of a gateway.

BRIEF DESCRIPTION OF THE DRAWINGS

The invention will become more fully understood from the detailed description given herein below illustration only, and thus is not limitative of the present invention, and wherein.

DETAILED DESCRIPTION

The present invention will be apparent from the following detailed description, which proceeds with reference to the accompanying drawings, wherein the same references relate to the same elements.

Figure 1:
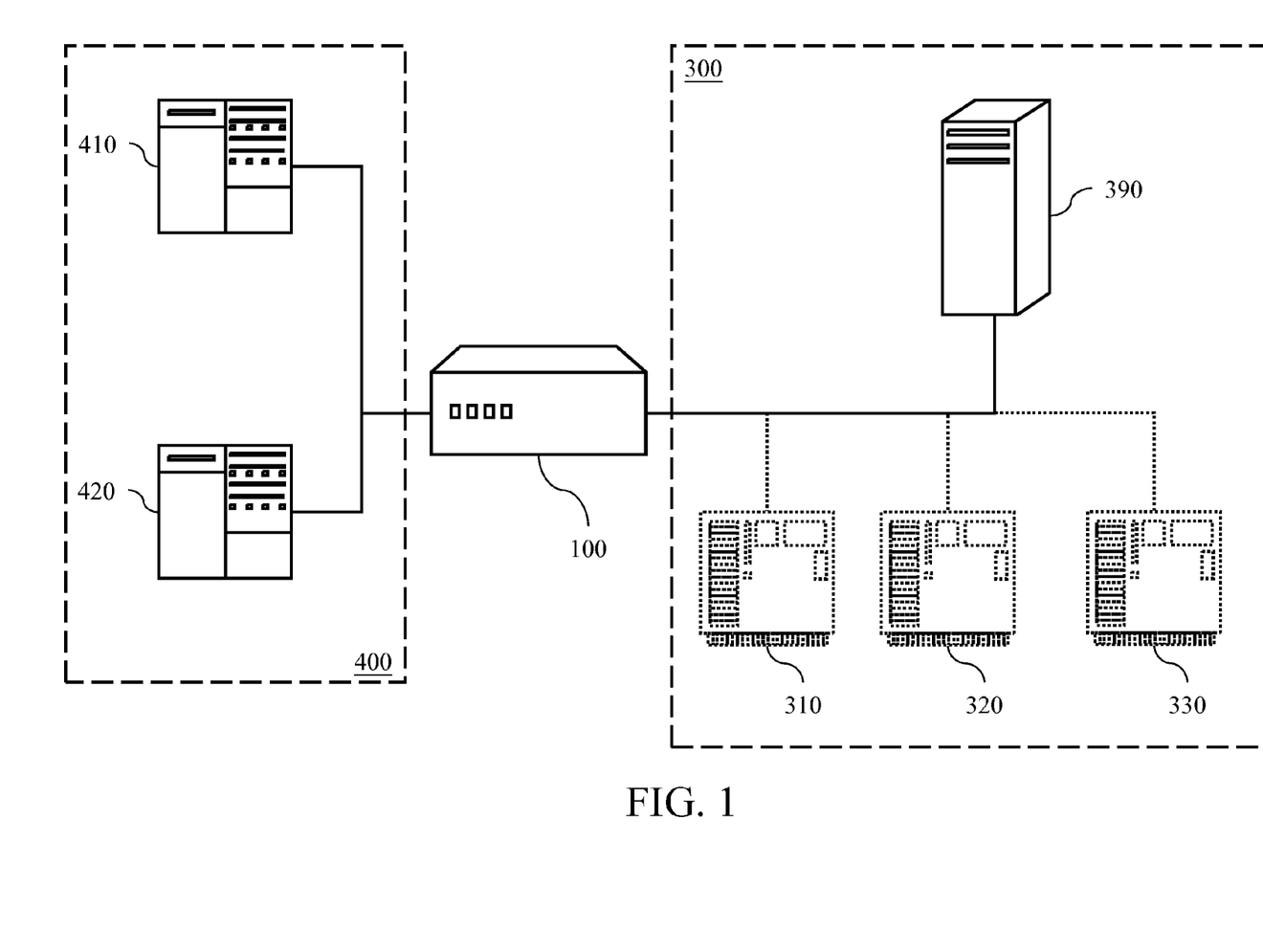
FIG. 1 is a schematic view of connections according to the invention.

As shown in FIG. 1, a gateway 100 that connects different networks actively collects communication commands used in a first network 300 and establishes the mapping relation between various communication commands and the communication I/O module used by a device in a second network 400 to access the data in the gateway 100. This enables immediate, automatic configuration setting for the gateway 100. Here the first network 300 uses a first communication protocol, and the second network 400 uses a second communication protocol.

Figure 2A:
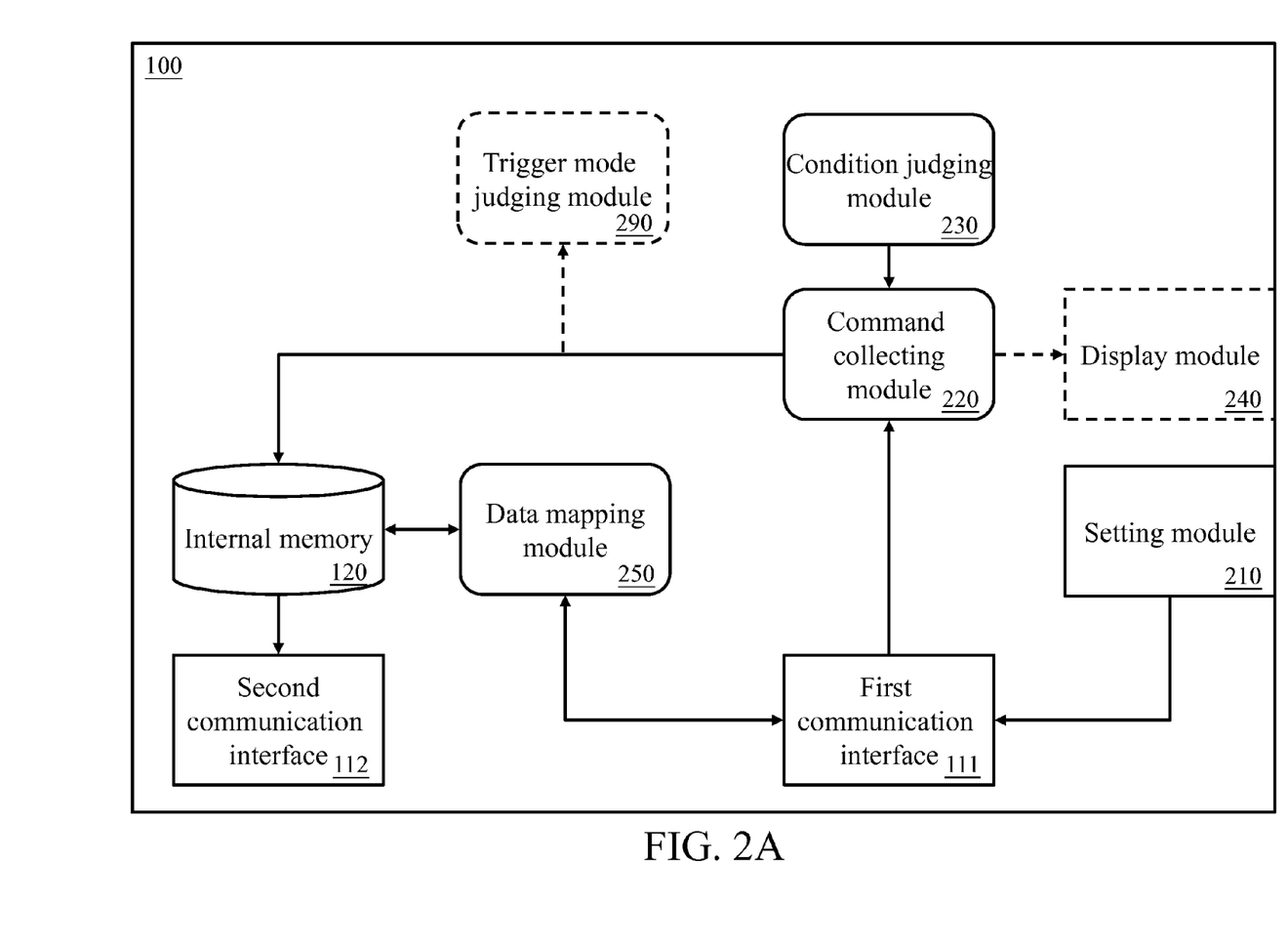
FIG. 2A shows the disclosed system for automatic setting configuration by learning commands.

FIG. 2A shows elements of the disclosed gateway for automatic setting configuration by learning commands. As shown in the drawing, the gateway 100 includes a first communication interface 111, a second communication interface 112, internal memory 120, a setting module 210, a command collecting module 220, a condition judging module 230, and a data mapping module 250.

The first communication interface 111 uses a first communication protocol to transmit data with first devices 310, 320, 330 in the first network 300.

The second communication interface 112 uses a second communication protocol to transmit data with second devices 410, 420 in the second network 400.

The internal memory 120 includes an input block and an output block. The output block allows the second devices 410, 420 to store target data written into the first devices 310, 320, 330. The input block stores the target data written into the second devices.

The setting module 210 sets the communication parameters in the first communication protocol used by the first communication interface 111, so that the gateway 100 can transmit data with the first device 310 of the first network 300. According to the invention, the first communication protocol can be, but not limited to, the fieldbus protocol that uses communication commands such Modbus, DF1, and CANbus to access data.

The communication parameters referred herein include, but not limited to, an operation mode, a baud rate, a parity, a stop bit, and an interface type. The operation mode can be Modbus RTU or Modbus ASCII when the first communication protocol is Modbus, full-duplex or half-duplex when the first communication protocol is DF1. The interface type can be, for example, RS-232, RS-422, or RS-485.

The command collecting module 220 collects communication commands transmitted in the first network 300 via the first communication interface 111 of the gateway 100. The command collecting module 220 can completely record the received communication commands. When the first communication protocol is Modbus, the contents of the communication commands recorded by the command collecting module 220 include, but not limited to, a slave address, a function code, a data start address, a quantity, and data in the communication commands. When the first communication protocol is DF1, the contents of the communication commands recorded by the command collecting module 220 include, but not limited to, a destination node address, a source node address, a command code, a function code, an address of memory location, and data.

In some embodiments, the command collecting module 220 can make the gateway 100 be a slave device of the first communication protocol, thereby receiving the communication commands transmitted from the master device of the first communication protocol to various slave devices of different slave addresses or to various destination nodes of different destination node addresses. When receiving a communication command, the command collecting module 220 sends a response to the slave device that sends out the communication command via the first communication interface 111, and records the received communication command. All received communication commands would be responded by the gateway except need not be responded ones, for example, broadcasting commands. For different interface types of the first communication interface 111 of the gateway 100, in other embodiments of the invention the command collecting module 220 also can make the gateway 100 be a sniffer device of the first communication protocol, thereby sniffing the communication commands transmitted from the master/source node to the slave/destination node in the first communication protocol. The sniffed communication commands are then recorded.

Besides, the command collecting module 220 further determines whether the gateway 100 supports the collected communication commands. When the gateway 100 supports, the collected communication commands are recorded. When the gateway 100 does not support, only such contents as the slave address and function code or node address and command code in the collected communication commands and the number of total received unsupported communication commands are recorded. Likewise, the command collecting module 220 can determine whether the collected communication commands are valid. When some of the collected communication commands are invalid, the command collecting module 220 can record the number of the received invalid communication commands and the slave address or destination node addresses with invalid communication commands.

The condition judging module 230 determines whether a stop collecting condition is satisfied. In this invention, the command collecting module 220 can continuously collect the communication commands until the condition judging module 230 determines that the stop collecting condition is met. The stop collecting condition referred herein can be set by the system. For example, it can be that the time of collecting communication commands has reached a particular system cycle, or the number of collected communication commands within a particular time does not increase any more. It can also be set by the user. For example, the user can define the stop collecting condition according to the total contents of the communication commands collected by the command collecting module 220, the number of collected communication commands, the total time for the command collecting module 220 to collect the communication commands. However, the stop collecting condition of the invention is not limited to the above-mentioned examples. Any condition that can be used to determine that the collection of communication commands transmitted in the first network 300 is complete can be used by the invention.

After the condition judging module 230 determines that the stop collecting condition is satisfied (i.e., after the command collecting module 220 stops collecting the communication commands transmitted in the first network 300), the data mapping module 250 determines first free address which doesn't occupied by other target data as the storage address from the input/output block in the internal memory 120 of the gateway 100 for the target data written/read by the received communication commands, configures a communication I/O module (not shown) according to data length of the target data, and maps the free address to the communication I/O module for the second device 410, 420 in the second network 400 to access the target data in the internal memory 120 of the gateway 100. Generally speaking, the data mapping module 250 determines the free address from bottom address to top address of the input/output block in the internal memory 120 of the gateway 100, but not limit to, for example, the data mapping module 250 can determine the free address from top address to bottom address of the input/output block.

After the data mapping module 250 maps the storage address of the target data to the communication I/O module, the second device 410, 420 in the second network 400 can access the target data from the communication I/O module. According to the invention, the second communication protocol used by the second network 400 can be, but not limited to, PROFIBUS, PROFINET, Ethernet/IP, and DeviceNet that use I/O data exchange for Fieldbus communication.

Besides, the disclosed gateway 100 further includes a display module 240 for showing such statistical data as the number of collected communication commands, the number of unsupported communication commands, the number of invalid communication commands, the slave addresses/destination node addresses and function codes/command codes with unsupported communication commands, or the slave addresses/destination node addresses with invalid communication commands.

The disclosed gateway 100 can also include a trigger mode judging module 290 for determining whether the communication command collected by the command collecting module 220 is collected for the first time. When the trigger mode judging module 290 determines that the communication command collected by the command collecting module 220 is collected for the first time, it defines the trigger mode of the first collected communication command as 'data change'. The data change trigger mode means when the gateway 100 works for exchanging target data between two different networks, the gateway 100 would send this communication command only as the corresponding target data in internal memory of the gateway 100 is changed. When the trigger mode judging module 290 determines that the communication command collected by the command collecting module 220 is not collected for the first time, it defines the trigger mode of the collected communication command as 'periodic transmission'. The periodic transmission trigger mode means when the gateway 100 works for exchanging target data between two different networks, the gateway 100 would periodically send this communication command for updating target data in internal memory of the gateway 100.

After defining the trigger mode of a communication command as 'periodic transmission', the trigger mode judging module 290 can calculate the polling interval of the communication command according to the time interval of the continuous communication commands received by the command collecting module 220. The calculating method includes, but not limited to, the following one. If the command collecting module 220 collects the communication command for three times or more, the trigger mode judging module 290 computes the mean value or the median of the time intervals between the communication commands collected by the command collecting module 220 and uses that as the polling interval.

Figure 2B:
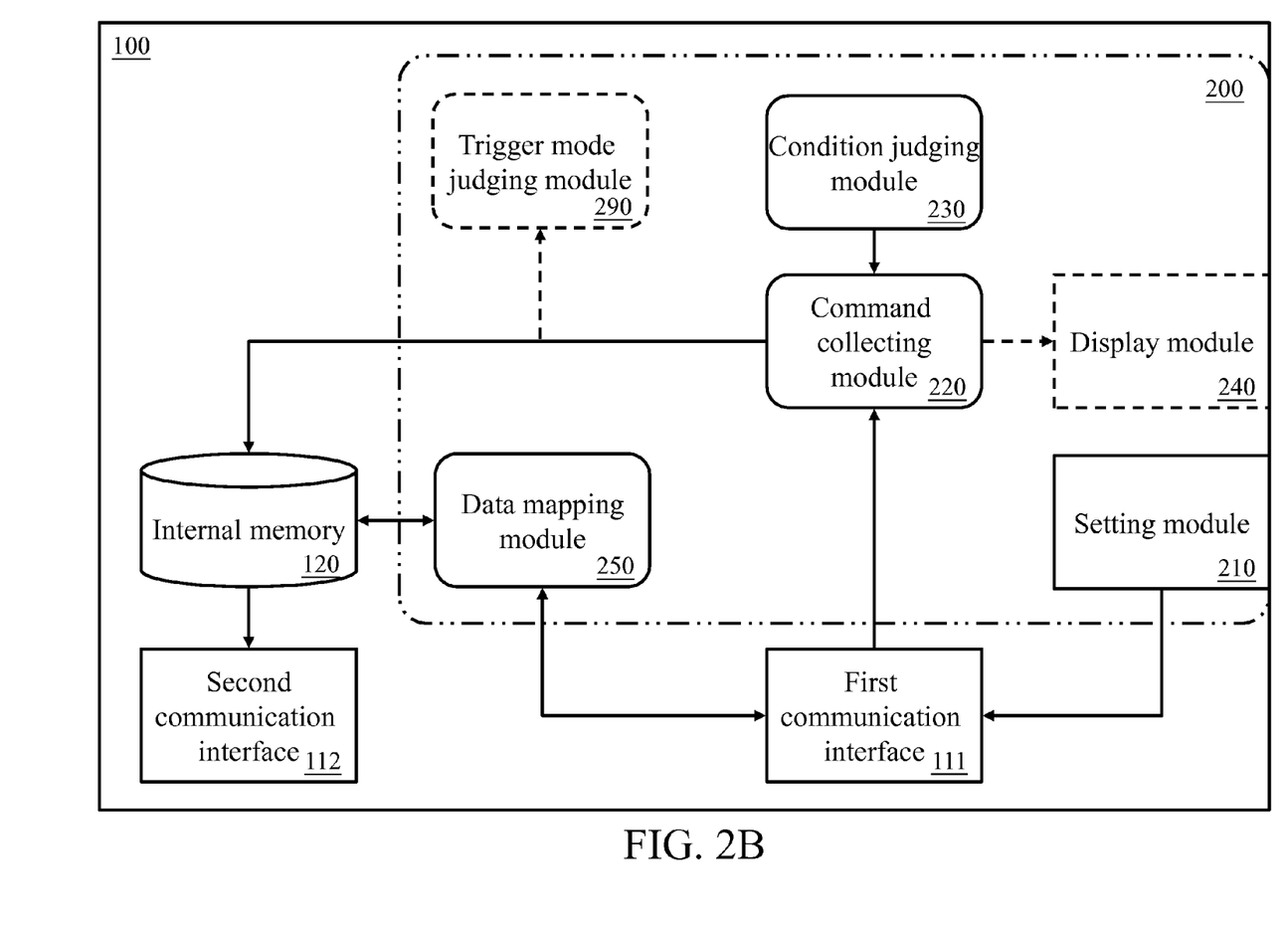
FIG. 2B shows the elements of the disclosed gateway for automatic setting configuration by learning commands.

In practice, the setting module 210, the command collecting module 220, the condition judging module 230, and display module 240, the data mapping module 250, and the trigger mode judging module 290 need not be in the form of modules in the gateway 100. As shown in FIG. 2B, a software/program can be used to be executed and generate a system 200 that includes the setting module 210, the command collecting module 220, the condition judging module 230, and display module 240, the data mapping module 250, and the trigger mode judging module 290. Since the operations of the modules are exactly the same as the above description, they are not repeated here.

One explicit is used to explain the disclosed system and method. Please also refer to FIG. 3A for a flowchart of the disclosed method for automatic setting configuration by learning commands. In this embodiment, the first communication protocol used by the first network 300 is Modbus, and the second communication protocol used by the second network 400 is PROFIBUS.

Figure 3A:
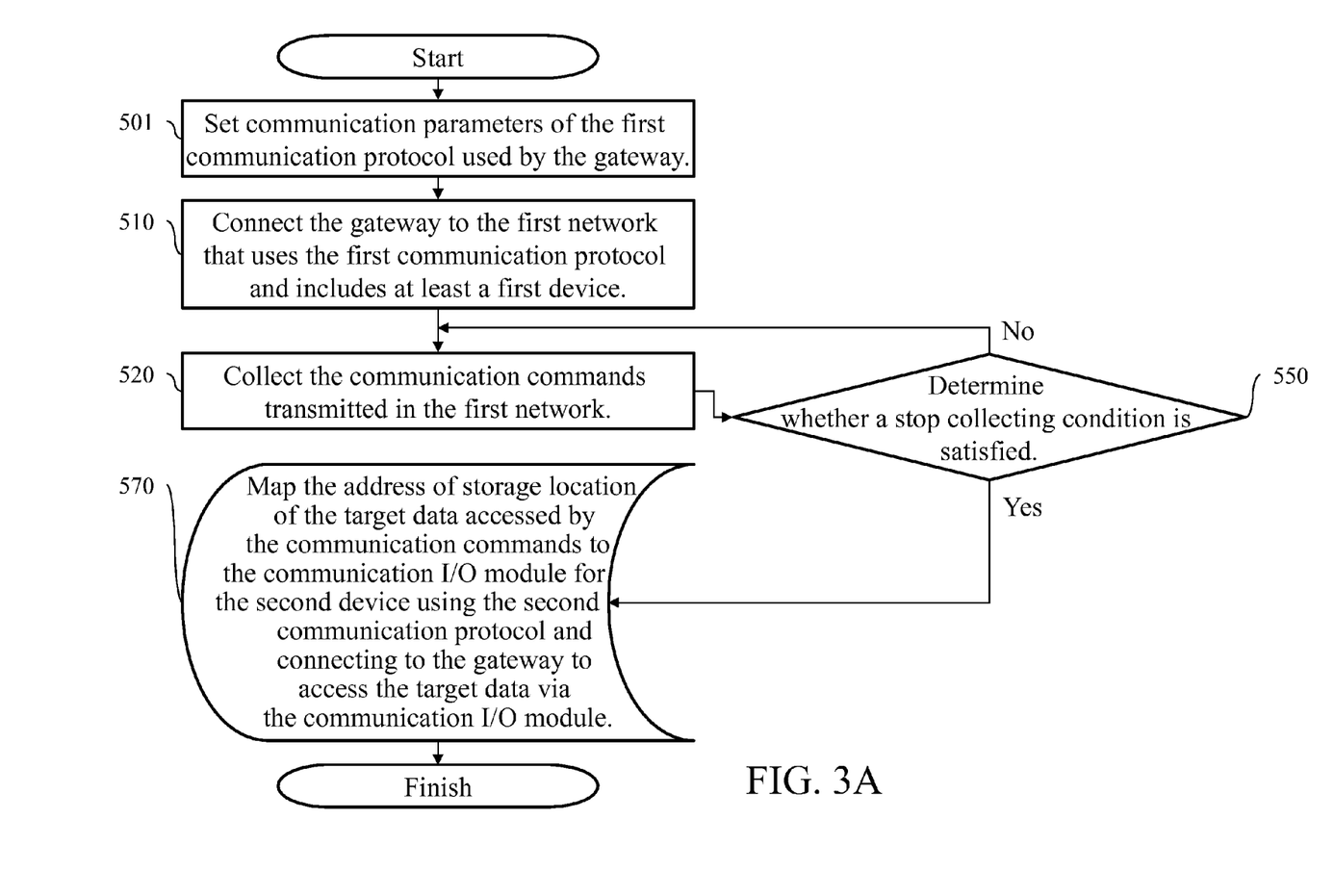
FIG. 3A is a flowchart of the disclosed method for automatic setting configuration by learning commands.

Since the communication protocols used by the first network 300 and the second network 400 are different, they need a gateway 100 to exchange data. If the gateway 100 is an embodiment of the invention, then the setting module 210 allows the user to set communication parameters for the first communication interface 111 of the gateway 100 to use the Modbus protocol, i.e., the first communication protocol (step 501). In this embodiment, the user can use the setting module 210 to set the operation mode, baud rate, parity, stop bit, and interface type of the first communication interface 111.

After user set the communication parameters of the first communication protocol for the first communication interface 111 of the gateway 100 via the setting module 210 (step 501), the first communication interface 111 can connect the gateway 100 to the first network 300 (step 510). In this embodiment, if the interface type of the first communication interface 111 is RS-232, then it means that the first network 300 has only a master device. The gateway 100 then connects to the master device of the first network 300 directly, becoming a slave device of the first network 300. If the interface type of the first communication interface 111 is RS-422 or RS-485, then the gateway 100 is multi-dropped on the first network 300. In this case, the first network 300 includes a master device and a plurality of slave devices, and the gateway 100 is a sniffer device thereon. The master device can be a programmable logic controller (PLC), a human-machine interface (HMI) or a computer that runs test program.

Figure 3B:
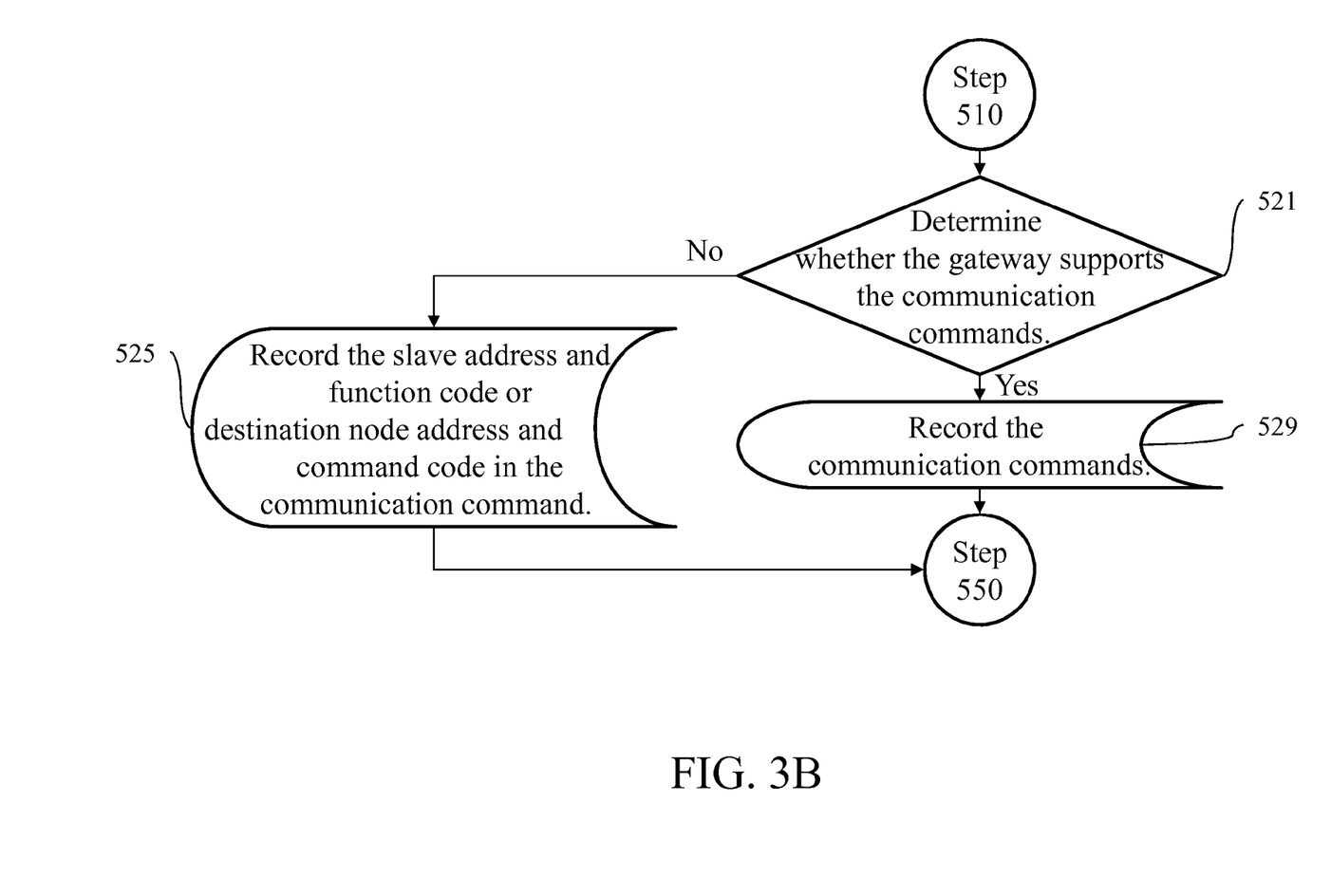
FIG. 3B is a flowchart of the method of recording communication commands according to the invention.

After the connection of the gateway 100 and the first network 300 (step 510), the command collecting module 220 can collect communication commands transmitted in the first network 300 via the first communication interface 111 (step 520). If the gateway 100 is a slave device of the first network 300, then the command collecting module 220 further sends a response via the first communication interface 111 to the master device after receiving a communication command from the master device. In this embodiment, as shown in FIG. 3B, the command collecting module 220 further determines whether the gateway 100 supports the communication command received by the first communication interface 111 (step 521). If the gateway 100 supports the communication command, then the communication command is recorded (step 529). That is, the slave address/destination node address, source node address, command code, function code, start address/address of memory location, quantity, and target data. If the gateway 100 does not support the communication command, the command collecting module 220 can simply records the slave address/destination node address and function code/command code therein (step 525).

Figure 3C:
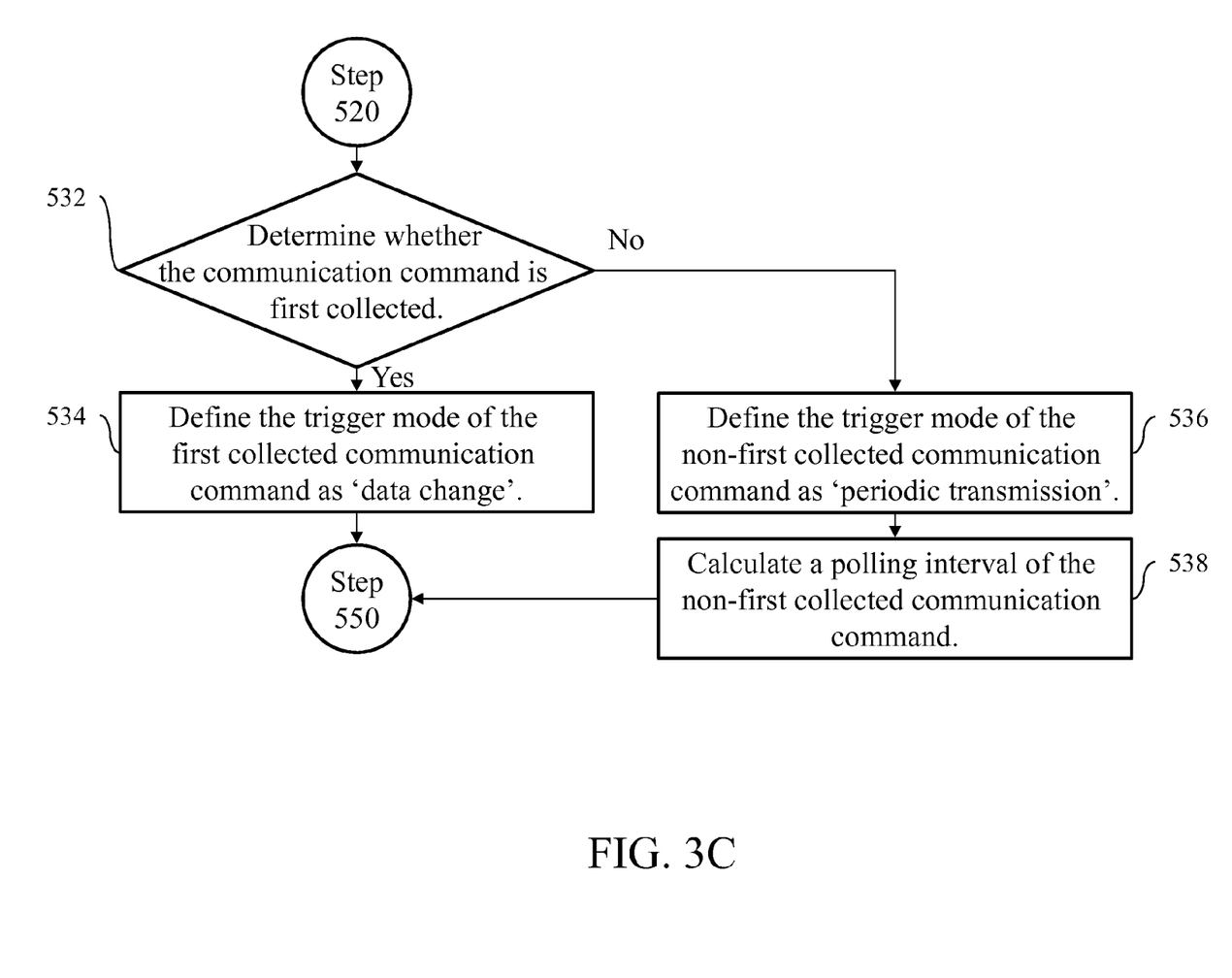
FIG. 3C is a flowchart of the method of determining the trigger mode according to the invention.

If the gateway 100 includes the trigger mode judging module 290, then the trigger mode judging module 290 can determine the trigger mode of the communication command collected by the command collecting module 220. As shown in FIG. 3C, the trigger mode judging module 290 can first determine whether the collected communication command is collected for the first time (step 532). If so, then the trigger mode judging module 290 defines the trigger mode of the communication command as 'data change' (step 534). If not, then the trigger mode judging module 290 defines the trigger mode of the communication command as 'periodic transmission' (step 536), and calculates a polling interval of the communication command according to the time intervals of the communication command as collected by the command collecting module 220 (step 538).

In FIG. 3A, when the command collecting module 220 collects communication commands (step 520), the condition judging module 230 also determines whether a stop collecting condition is satisfied (step 550). In this embodiment, suppose the stop collecting condition is that the communication command collecting time has reached three system cycles. Then after the communication command collecting time of the command collecting module 220 has reached three system cycles, the condition judging module 230 determines that the stop collecting condition is satisfied. Thus, the command collecting module 220 stops collecting the communication commands. In this case, the gateway 100 completes the setting of the communication commands used in the first network 300 according to the contents of the communication commands collected by the command collecting module 220, hence becoming a new master device on the first network to replace the original master device 390. If the gateway 100 is originally multi-dropped on the first network 300 (with the gateway 100 being a sniffer device), then the user has to break the connection between the original master device 390 and the first network 300 to avoid the interference of the original master device 390 when the gateway 100 communicates with the slave devices (first devices 310/320/330) subsequently. If the gateway 100 is originally connected to the original master device 390 (the gateway 100 being a slave device), then the user needs to connect the gateway to the first devices 310/320/330 in the first network 300 for subsequent data exchanges.

Once the gateway 100 becomes the master device of the first network 300, i.e., the condition judging module 230 determines that the stop collecting condition is met and lets the command collecting module 220 to stop collecting communication commands, the data mapping module 250 maps the storage addresses of the target data accessed by the communication commands to the communication I/O module used by the second device 410 to access the target data (step 570).

Figure 3D:
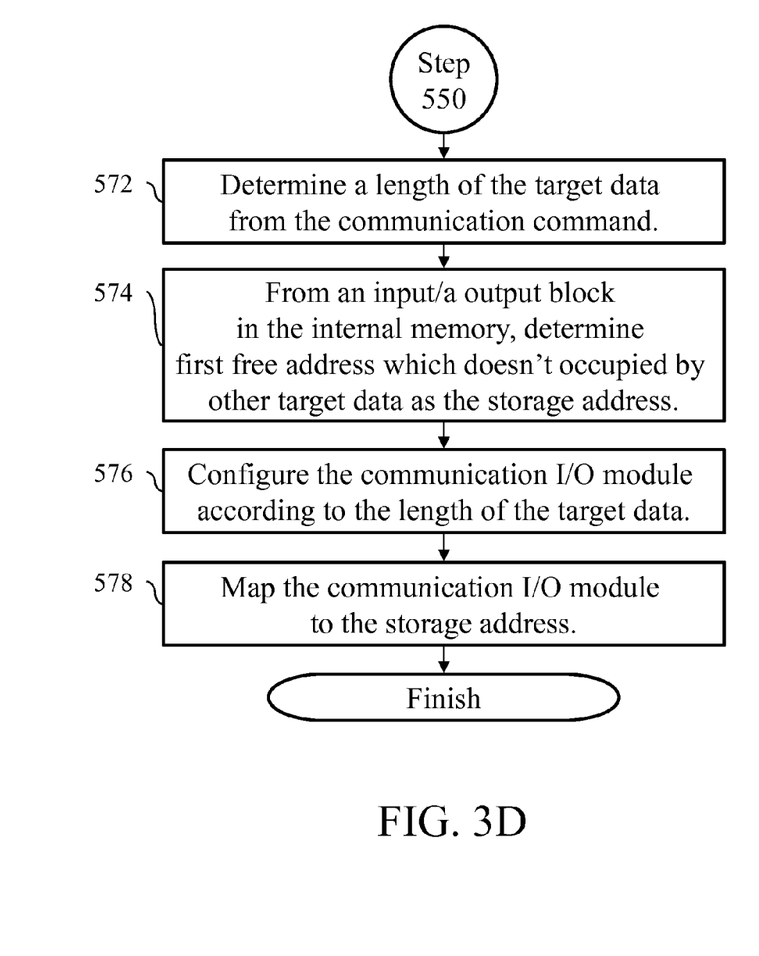
FIG. 3D is a flowchart of the method of mapping the communication I/O module to the storage address according to the invention.
Figure 4A:
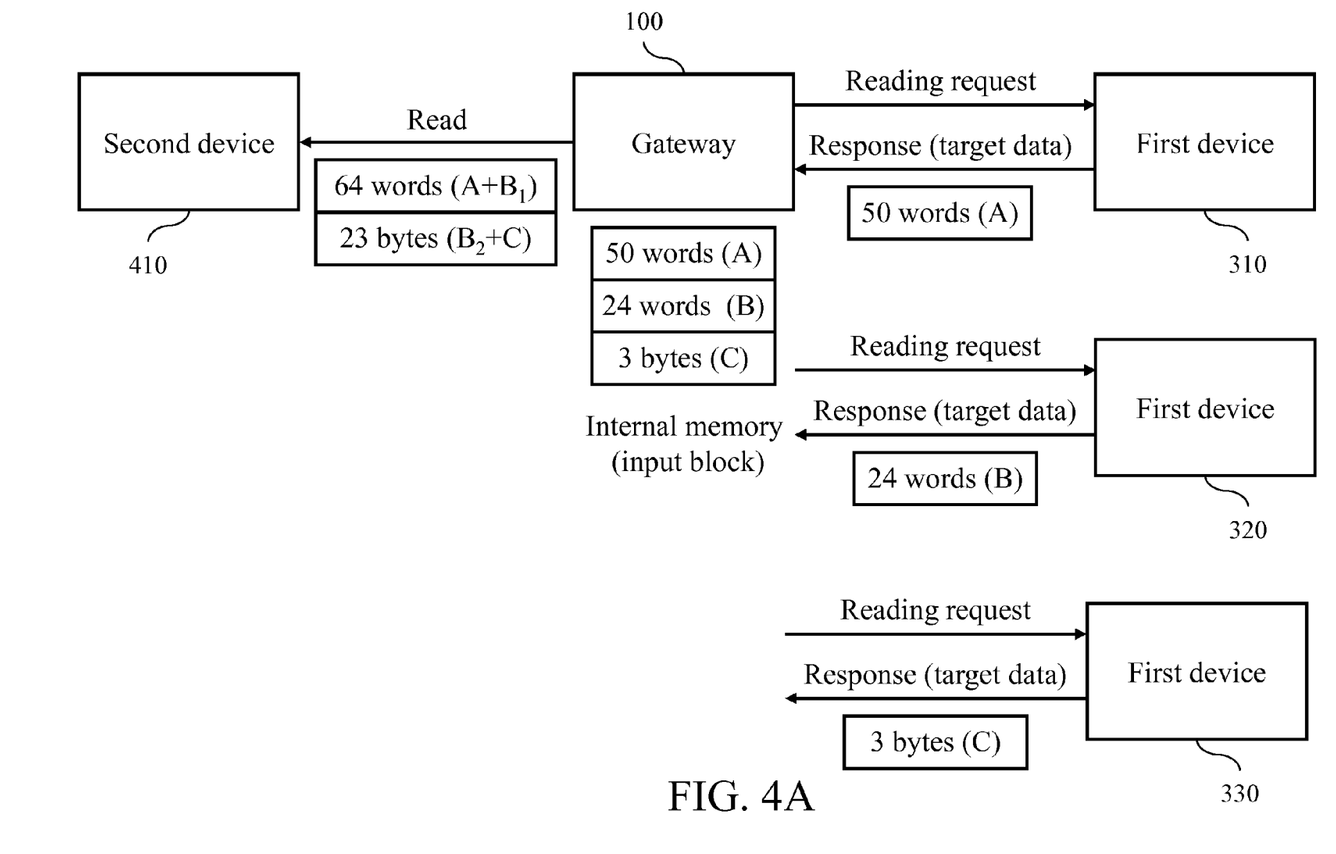
FIG. 4A shows data transmission according to an embodiment of the invention.

In this embodiment, suppose the command collecting module 220 has collected three reading communication commands. The collected communication commands mean that the user wants to read the data in the first device 310, 320, 330 of the first network 300 from the second device 410 of the second network 400. As shown in FIG. 4A, the gateway 100 transmits the communication command (first communication command) of reading request to the first device 310. After receiving the reading request, the first device 310 returns 50 words of target data according to the reading request. As shown in FIG. 3D, the data mapping module 250 uses the function code and quantity in the reading request transmitted from the gateway to determine the length of the target data (step 572). The data mapping module 250 also determines first free address (the storage address) which doesn't occupied by other target data from the input block in the internal memory 120 of the gateway 100 (step 574), and writes the target data returned from the first device 310 to the determined free address. Likewise, the gateway 100 also sends a reading request (second communication command and third communication command) to the other first devices 320, 330. If the first device 320 and the first device 330 return 24 words and 3 bytes of target data, respectively, then the data mapping module 250 writes the target data returned from the first device 320 and the first device 330 into the internal memory 120 just after the storage space of the target data returned from the first device 310.

Afterwards, the data mapping module 250 can configure the communication I/O module with the PROFIBUS protocol to the storage space of the target data returned from the first devices 310, 320, 330 according to the length of the target data (step 576), and can map the configured communication I/O module to the storage address storing the target data (step 578). Since the target data totally occupy 151 bytes, the data mapping module 250 can configure 64 words and 23 bytes of communication I/O module (using the minimal communication I/O module) or 50 words, 24 words, and 3 bytes of communication I/O module (using three communication I/O modules corresponding to the three communication command individually) to the storage space of the target data, and can map the 64 words and 23 bytes of communication I/O module or 50 words, 24 words, and 3 bytes of communication I/O module to the storage address storing the target data. Afterwards, the second device 410 can read the target data stored in the internal memory 120 following the configured communication I/O module.

Figure 4B:
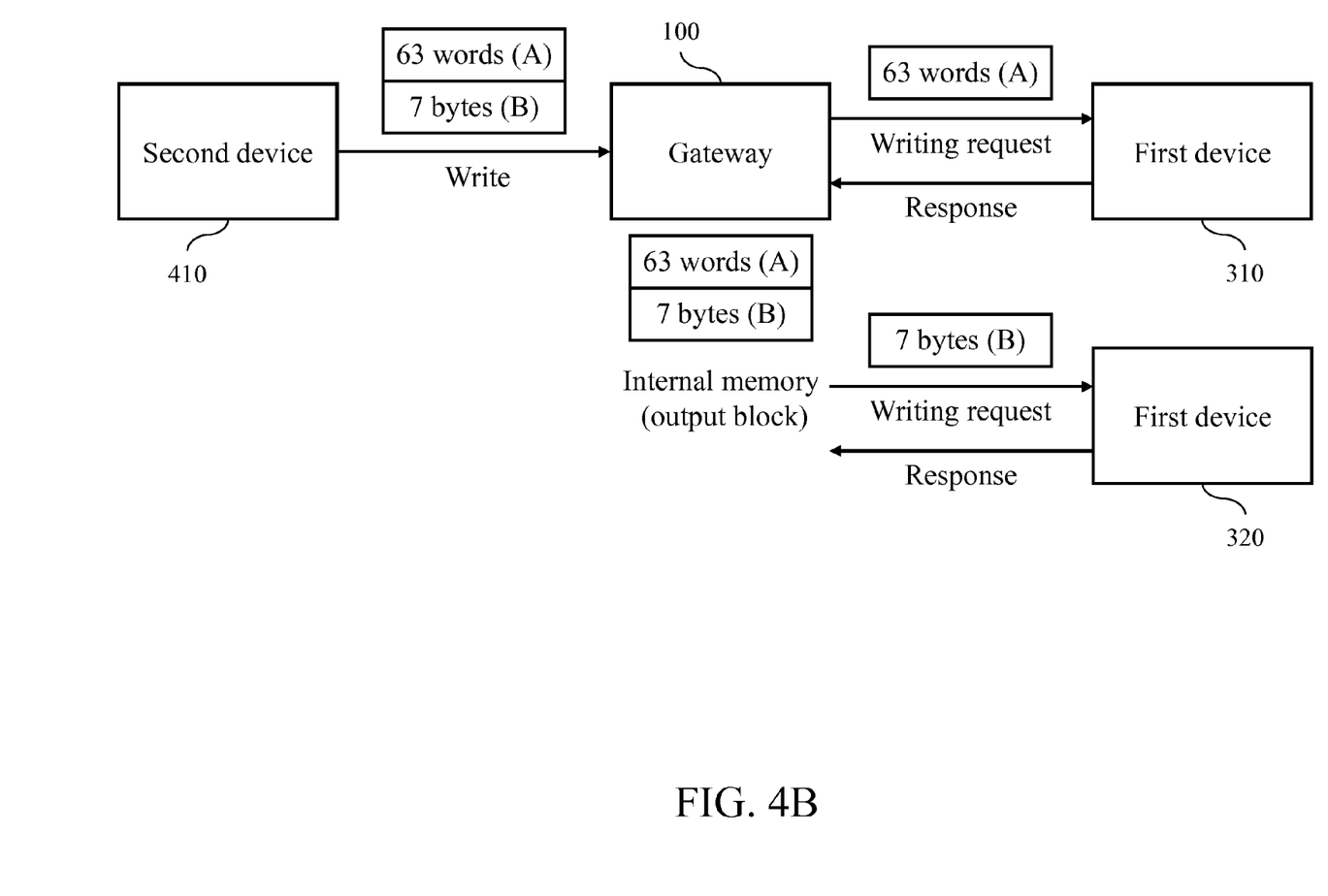
FIG. 4B shows data transmission according to an embodiment of the invention.

Suppose during the process of collecting communication commands, the command collecting module 220 collects two writing communication commands. In particular, the collected communication command means that the user wants to write the data in the second device 410 of the second network 400 into the first device 310, 320 of the first network 300. As shown in FIG. 4B, after the data mapping module 250 configures 63 words and 7 bytes of communication I/O module, the second device 410 can write the target data into the output block of the internal memory 120 of the gateway 100 via the communication I/O module. After the second device 410 uses 63 words and 7 bytes of the communication I/O module to write the target data into the storage locations of internal memory 120 that correspond to the first device 310 and the first device 320, respectively, the gateway 100 transmits the writing requests including 63 words and 7 bytes of target data to the first device 310 and the first device 320 according to the trigger mode of the writing request (fourth communication command and fifth communication command). That is, according to the polling interval computed by the trigger mode judging module 290, writing requests are sent periodically. Alternatively, writing requests are sent when value changing of the corresponding target data in the output block of the internal memory 120 is detected.

After receiving the writing request, the first device 310 stores the 63 words of target data according to the writing request. Likewise, after receiving the writing request, the first device 320 stores the 7 bytes of target data according to the writing request. Hence, the second device 410 can write the target data into the first devices 310, 320 using a different communication protocol via the gateway 100.

In summary, the invention differs from the prior art in that the invention collects communication commands transmitted in the first network and maps the addresses of storage locations for the target data accessed by the communication commands to the communication I/O module for the second device to access the target data at the gateway. This technique solves that problem in the prior art that it is difficult and time-consuming to set the gateway for different networks. The invention achieves the goal of increasing the efficiency of gateway configuration setting.

Moreover, the disclosed method for automatic setting configuration by learning commands can be implemented in hardware, software or the combination thereof. It can also be implemented in computer systems in a centralized way or distributed in several connected computer systems.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method for automatic setting configuration by learning commands applied to a gateway, the method comprising the steps of:
    setting communication parameters of a first communication protocol used by the gateway;
    connecting the gateway to a first network using the first communication protocol, the first network including at least one first device and one of the first device is a master device;
    collecting at least one communication command by setting the gateway as a slave/sniffer device to receives/sniff the at least one communication command sent from a mater device to a plurality of slave devices with different slave addresses or destination nodes of different destination node addresses and record the at least one communication command in an internal memory of the gateway until a stop collecting condition is satisfied;
    establishing a mapping relation between the collected at least one communication command and at least one communication I/O module used by a second device in a second network for setting configuration of the gateway, the second device uses a second communication protocol to connect to the gateway comprise steps of:
    determining a length of the target data from the communication command;
    from an input/a output block in the internal memory, determining first free address which doesn't occupied by other target data as a storage address, wherein determining the free address from bottom address to top address of the input/output block;
    configuring the communication I/O module according to the length of the target data; and
    mapping the communication I/O module to the storage address;
    becoming a new master device on the first network to replace the master device based on the set configuration for the gateway when the master device is removed from the first network; and
    accessing the target data accessed based on one of the at least one communication command stored in the internal memory of the gateway via the at least one communication I/O module by the second device.

2. The method of claim 1, wherein the step of collecting at least one communication command transmitted in the first network is followed by the step of determining whether each of the at least one communication command is first collected, defining the trigger mode of the first collected communication command as 'data change' and defining the trigger mode of non-first collected communication command as 'periodic transmission' , and calculating a polling interval of the non-first collected communication command.

3. The method of claim 1, wherein the step of collecting at least one communication command includes the step of determining whether the at least one communication command is supported by the gateway and recording the at least one communication command when supported or recording slave address and function code or destination node addresses and command code in the at least one communication command when not supported.

4. The method of claim 1, wherein the stop collecting condition is that when the communication command collecting time reaches a specific system cycle, that the number of collected communication commands within a specific time does not increase any more, or defined by the received communication commands, the number of received communication commands, and/or the time used to collect the communication commands.

5. A gateway for automatic setting configuration by learning commands, comprising:
    an internal memory;
    a first communication interface, which connects to a first network with a first communication protocol, the first network including at least one first device and one of the first device is a master device;
    a second communication interface, which connects to a second network with a second communication protocol, the second network including at least one second device;
    a setting module, which sets communication parameters of the first communication protocol used by the first communication interface;
    a condition judging module, which determines whether a stop collecting condition is satisfied;
    a command collecting module, which collects at least one communication command by setting the gateway as a slave/sniffer device to receives/sniff the at least one communication command sent from a mater device to a plurality of slave devices with different slave addresses or destination nodes of different destination node addresses and record the at least one communication command in the internal memory via the first communication interface until the condition judging module determines that the stop collecting condition is satisfied; and
    a data mapping module, which sets configuration of the gateway by establishing a mapping relation between the collected at least one communication command and at least one communication I/O module used by a device in a second network for becoming a new master device on the first network to replace the master device based on the set configuration for the gateway when the master device is removed from the first network, then the second device accesses target data accessed based on one of the at least one communication command stored in the internal memory via the at least one communication I/O module, wherein the data mapping module configures the communication I/O module according to length of the target data and maps the communication I/O module to a storage address after determines first free address which doesn't occupied by other target data as the storage address from an input/a output block in the internal memory, and the data mapping module determines the free address from bottom address to top address of the input/output block.

6. The gateway of claim 5, wherein the gateway further includes a trigger mode judging module for determining whether each of the at least one communication command is first collected, defining the trigger mode of the first collected communication command as 'data change' and defining the trigger mode of non-first collected communication command as 'periodic transmission', and calculating a polling interval of the non-first collected communication command.

7. The gateway of claim 5, wherein the command collecting module determines whether the at least one communication command is supported by the gateway and recording the at least one communication command when supported or recording the slave address and function code or destination node addresses and command code in the at least one communication command when not supported.

8. The gateway of claim 5, wherein the stop collecting condition is that when the communication command collecting time reaches a specific system cycle, that the number of collected communication commands within a specific time does not increase any more, or defined by the received communication commands, the number of received communication commands, and/or the time used to collect the communication commands.

9. The gateway of claim 5, wherein the gateway further includes a display module for displaying the number of collected communication commands, the number of unsupported communication commands, the number of invalid communication commands, slave address and function code or destination node addresses and command code that do not support the communication commands, or the slave address or destination node addresses with invalid communication commands.

10. The gateway of claim 5, wherein first communication protocol is a fieldbus protocol that uses the at least one communication command to access data.

11. The gateway of claim 5, wherein second communication protocol uses I/O data exchange for communication.

* * * * *